United States Patent
Vasseur

(10) Patent No.: US 8,934,496 B2
(45) Date of Patent: Jan. 13, 2015

(54) REACTIVE AND PROACTIVE ROUTING PROTOCOL INTEROPERATION IN LOW POWER AND LOSSY NETWORKS

(75) Inventor: Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 13/561,716

(22) Filed: Jul. 30, 2012

(65) Prior Publication Data

US 2014/0029624 A1    Jan. 30, 2014

(51) Int. Cl.
*H04L 12/28* (2006.01)
*H04L 12/715* (2013.01)

(52) U.S. Cl.
CPC ............................. *H04L 45/04* (2013.01)
USPC ..................... 370/401; 370/389; 709/238

(58) Field of Classification Search
CPC .............................. H04L 45/00; H04L 45/04
USPC ......... 370/401, 338, 328, 238, 310, 389, 392; 709/238
See application file for complete search history.

(56) References Cited

U.S. PATENT DOCUMENTS

| | | | |
|---|---|---|---|
| 7,177,295 B1 * | 2/2007 | Sholander et al. ............ | 370/338 |
| 7,764,618 B2 | 7/2010 | Salama et al. | |
| 8,121,136 B2 * | 2/2012 | Asati et al. .................... | 370/401 |
| 8,291,112 B2 | 10/2012 | Vasseur et al. | |
| 8,363,666 B2 | 1/2013 | Donthamsetty et al. | |
| 2001/0033556 A1 * | 10/2001 | Krishnamurthy et al. ..... | 370/329 |
| 2008/0140784 A1 * | 6/2008 | O'Sullivan et al. ........... | 709/206 |
| 2008/0170550 A1 * | 7/2008 | Liu et al. ........................ | 370/338 |
| 2009/0228575 A1 | 9/2009 | Thubert et al. | |
| 2010/0083035 A1 * | 4/2010 | Kim et al. ......................... | 714/4 |
| 2011/0090791 A1 | 4/2011 | Udupi et al. | |
| 2011/0128884 A1 * | 6/2011 | Reynaud et al. .............. | 370/252 |
| 2013/0034031 A1 * | 2/2013 | Sherman et al. .............. | 370/310 |

OTHER PUBLICATIONS

Clausen et al., "The LLN On-demand Ad hoc Distance-vector Routing Protocol—Next Geberation (LOADng)", Network Working Group, Jul. 14, 2012, 58 pages.*
Winter et al., .,"RPL: IPv6 Routing Protocol for Low-Power and Lossy Networks" IETF, Request for Comments 6550, Mar. 2012, 158 pages.*

(Continued)

*Primary Examiner* — Andrew Lai
*Assistant Examiner* — Sumitra Ganguly
(74) *Attorney, Agent, or Firm* — Parker Ibrahim & Berg LLC; James M. Behmke; Kenneth J. Heywood

(57) ABSTRACT

In one embodiment, a border node between a reactive routing network and a proactive routing network may receive an inter-domain route request (RREQ) from a requestor for a destination, and determines whether it knows the destination. In response to knowing the destination, the border node responds to the requestor. However, in response to not knowing the destination at the border node, when the border node is ingressing the inter-domain RREQ into the proactive routing network, it sends the inter-domain RREQ to each other border node of the proactive routing network. Alternatively, when the border node is ingressing the inter-domain RREQ into the reactive routing network, it sends the inter-domain RREQ into the reactive routing network.

17 Claims, 16 Drawing Sheets

(56) References Cited

OTHER PUBLICATIONS

Liu et al, "Declarative Policy-Based Adaptive Mobile Ad Hoc Networking", IEEE/ACM Trabnscations on Networking, vol. 20, No. 3, Jun. 2012, pp. 770-783, New York, N.Y.*

Clausen et al, "The LLN On-Demand Ad hoc Distance-vector Routing Protocol—Next Generation (LOADng)", Network Working Group, Jul. 14, 2012, 58 pages.*

Winter et al, "RPL: IPv6 Routing Protocol for Low-Power and Lossy Networks" IETF, Request for Comments 6550, Mar. 2012, 158 pages.*

Clausen, et al., "The LLN On-demand Ad hoc Distance-vector Routing Protocol—Next Generation (LOADng)", IETF Trust, Network Working Group, Internet Draft, draft-clausen-lln-loadng-05, Jul. 2012, 58 pages.

Winter, et al., "RPL: IPv6 Routing Protocol for Low-Power and Lossy Networks", IETF Request for Comments 6550, Mar. 2012, 158 pages.

Finnie, et al., "Notification of Transmittal of the International Search Report and the Written Opinion of the International Searching Authority, or the Declaration", Patent Cooperation Treaty, International Application No. PCT/US2013/052557, mailed Oct. 10, 2013, 13 pages, European Patent Office, Rijswijk, Netherlands.

IP.com, "Method and System for Providing a Protocol to Enable Inter-Domain Routing of Signals Among Different Ad Hoc Networks", IP.com Journal, Oct. 2011, 2 pages, IP.com Inc., West Henrietta, NY.

Liu, et al., "Declarative Policy-Based Adaptive Mobile Ad Hoc Networking", IEEE/ACM Transactions on Networking, vol. 20, No. 3, Jun. 2012, pp. 770-783, New York , NY.

Ma, et al., "Comparisons of Inter-Domain Routing Schemes for Heterogeneous Ad Hoc Networks", Proceedings of the Sixth IEEE International Symposium ona World of Wireless Mobile and Multimedia Networks (WoWMoM'05), Jun. 2005, pp. 268-373, Taormina-Giardini Naxos, Italy.

* cited by examiner

REACTIVE AND PROACTIVE ROUTING PROTOCOL INTEROPERATION IN LOW POWER AND LOSSY NETWORKS

TECHNICAL FIELD

The present disclosure relates generally to computer networks, and, more particularly, to interoperation between reactive and proactive routing protocols.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. Routing in LLNs is undoubtedly one of the most critical challenges and a core component of the overall networking solution. Two fundamentally and radically different approaches, currently without any interaction, each with certain advantages and drawbacks, have been envisioned for routing in LLN/ad-hoc networks known as:

1) Proactive routing: routing topologies are pre-computed by the control plane (e.g., IS-IS, OSPF, RIP, and RPL are proactive routing protocols); and 2) Reactive routing: routes are computed on-the-fly and on-demand by a node that sends a discovery probes throughout the network (e.g., AODV, DYMO, and LOAD are reactive routing protocols).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
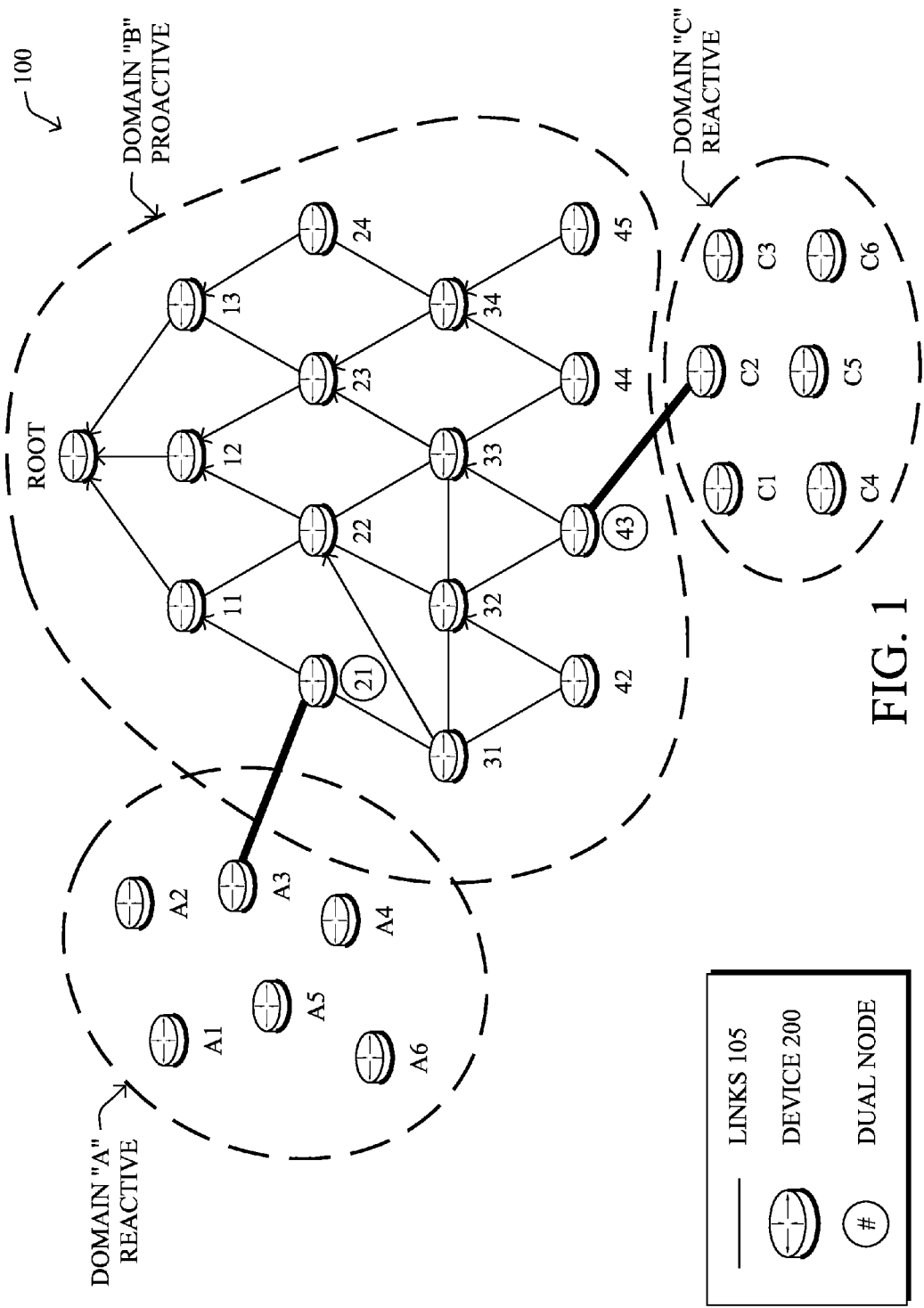
FIG. 1 illustrates an example communication network having proactive and reacting routing domains.

According to one or more embodiments of the disclosure, a border node between a reactive routing network and a proactive routing network may receive an inter-domain route request (RREQ) from a requestor for a destination, and determines whether it knows the destination. In response to knowing the destination, the border node responds to the requestor. However, in response to not knowing the destination at the border node, when the border node is ingressing the inter-domain RREQ into the proactive routing network, it sends the inter-domain RREQ (e.g., after encapsulation) to each other border node of the proactive routing network. Alternatively, when the border node is ingressing the inter-domain RREQ into the reactive routing network, it sends the inter-domain RREQ into the reactive routing network.

According to one or more additional embodiments of the disclosure, a requestor in a reactive routing network determines a need for a route to a destination, and sends an inter-domain RREQ from the requestor to a border node between the reactive routing network and a proactive routing network interconnected with zero or more other reactive routing networks.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (as described in FIG. 2 below) interconnected by various methods of communication. For instance, the links may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. As shown, network 100 comprises three illustrative network domains, namely, reactive domains "A" and "C" interconnected by a proactive domain "B", as described herein. Illustratively, nodes 200 within reactive domain A are labeled as "A1-A6", and within reactive domain C are labeled as "C1-C6". Nodes within proactive domain B are labeled as "root," "11," "12," . . . "45". Notably, as described in greater detail below, nodes 21 and 43 are shown as "DUAL" nodes (border nodes). Those skilled in the art will understand that any number of nodes, devices, links, etc. may be used in the computer network, and that the view shown herein is for simplicity. Also, those skilled in the art will further understand that while the network domains are shown in a certain orientation, particularly with a "root" node and/or singular border nodes between domains, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
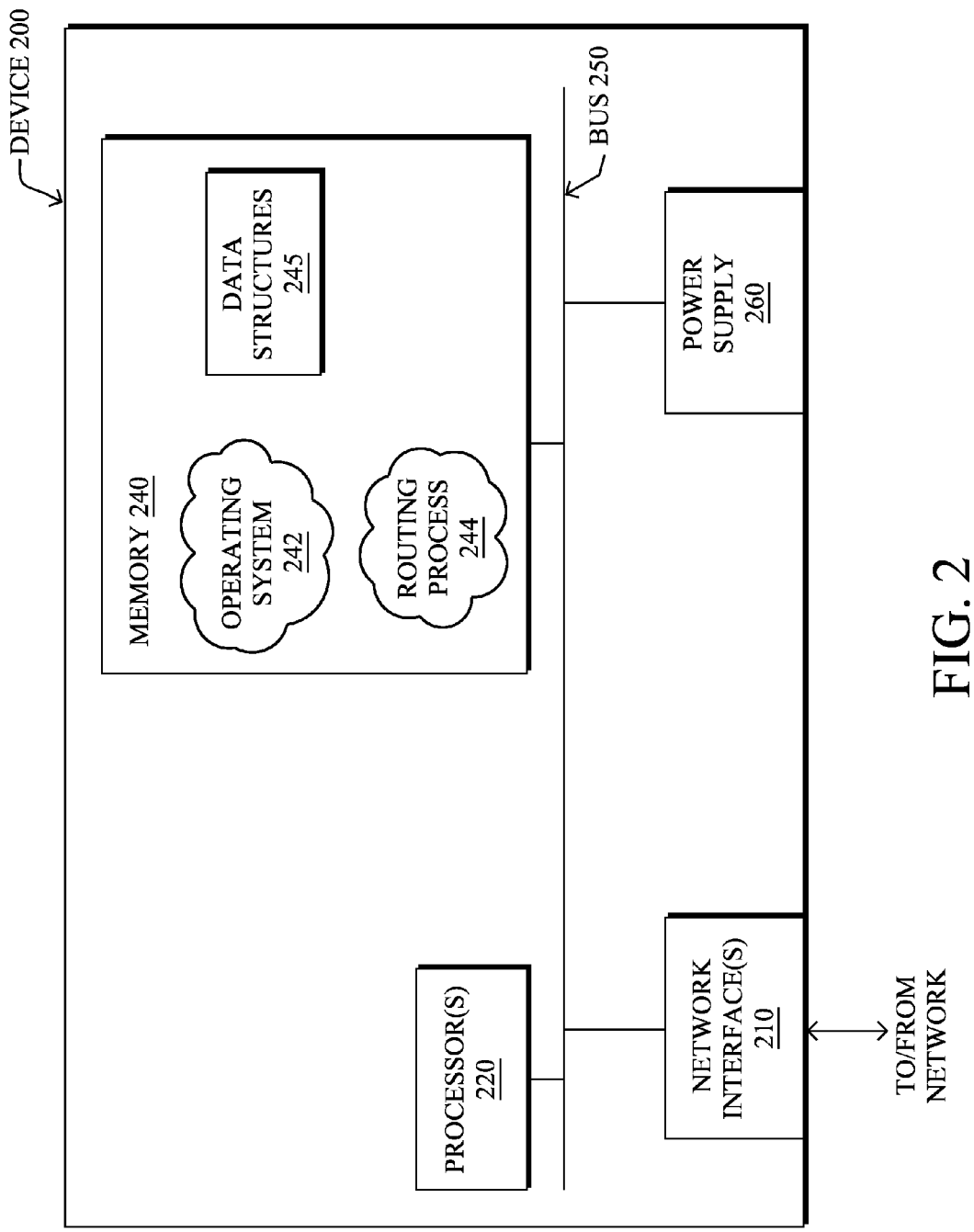
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244, as described herein. Note that while the routing process 244 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, routing in LLNs is undoubtedly one of the most critical challenges and a core component of the overall networking solution. Two fundamentally and radically different approaches have been envisioned for routing in LLN/ad-hoc networks known as proactive routing (routing topologies are pre-computed by the control plane) and reactive routing (routes are computed on-the-fly and on-demand by a node that sends a discovery probes throughout the network).

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing is protocol that builds a Directed Acyclic Graph (DAG) or Destination Oriented Directed Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

An example reactive routing protocol is specified in an IETF Internet Draft, entitled "LLN On-demand Ad hoc Distance-vector Routing Protocol—Next Generation (LOADng) "<draft-clausen-lln-loadng-05> by Clausen, et al. (Jul. 14, 2012 version), provides a reactive routing protocol for LLNs, e.g., as derived from AODV. Other reactive routing protocol efforts include the G3-PLC specification approved by the ITU, and also one described in an informative annex of IEEE P1901.2.

One stated benefit of reactive routing protocols is that their state and communication overhead scales with the number of active sources and destinations in the network. Such protocols only initiate control traffic and establish state when a route to a destination is unknown. In contrast, proactive routing protocols build and maintain routes to all destinations before data packets arrive and incur state and communication overhead that scales with the number of nodes, rather than the number of active sources and destinations. Some believe that reactive routing protocols are well-suited for certain Smart Grid Automated Meter Reading (AMR) applications where a Collection Engine reads each meter one-by-one in round-robin fashion. In such simplistic applications, only one source-destination pair is required at any point in time. Reactive routing protocols, however, have a number of technical issues that are particularly exhibited in large-scale LLNs, such as large utility networks.

As noted above, proactive and reactive routing networks have generally been separated, i.e., not interoperable. However, since it is expected that these routing approach networks may need to communicate with one another, and may eventually lead to one routing approach, it is important to have a solution allowing for the mix of both types of networks with a way to migrate from proactive networks to reactive networks, or vice versa.

The techniques herein thus allow for "reactive-over-proactive" routing with the objective to provide for co-habitation of the two networks in one of the available deployment scenarios, which consists of deploying a core network based on proactive routing surrounded by reactive routing domains, in order to transition to a single routing domain. In particular, the techniques herein introduce an architecture and mechanism to enable the inter-operation of routing protocols of different natures. Illustratively, in one or more embodiments as described in greater detail below, a searching ("requesting") node in a reactive domain generates a RREQ message that is either systematically processed by border nodes interconnecting domains (called DUAL nodes) or only processed by sending a unicast request to such DUAL nodes. (Duplicated requests may be discarded using a temporary cached request, described herein). At this point, if the receiving DUAL node does not know the route for the searched destination, the RREQ is multicasted in the proactive domain along the pre-computed routing topology (e.g., DAG) searching for the destination reactive domain where the destination resides. If the searched destination is found within the DAG (storing mode) or the prefix storing DAG root (non-storing mode), a positive reply is returned back to the DUAL node that generates in turn a positive RREP. Otherwise, the search is multicasted to each DUAL node. Upon receiving a request, a receiving DUAL node re-generates the RREQ mode in their remote domain and the DUAL node receiving a RREP message disseminates the search destination in a DAO message after notifying the DUAL node that originated the search, via a unicast message, that the destination was found. The last component consists of the requesting node searching for a destination to make use of loose hop routing using the DUAL mode as a proxy.

Illustratively, the techniques described herein may be performed by hardware, software, and/or firmware, such as in accordance with the routing process 244, which may contain computer executable instructions executed by the processor 220 (or independent processor of interfaces 210) of capable nodes (e.g., requesting nodes or border/DUAL nodes) to perform functions relating to the techniques described herein. For example, the techniques herein may be treated as extensions to conventional protocols, such as the various reactive and/or proactive routing protocols, and as such, may be processed by similar components understood in the art that execute those protocols, accordingly.

Figure 3:
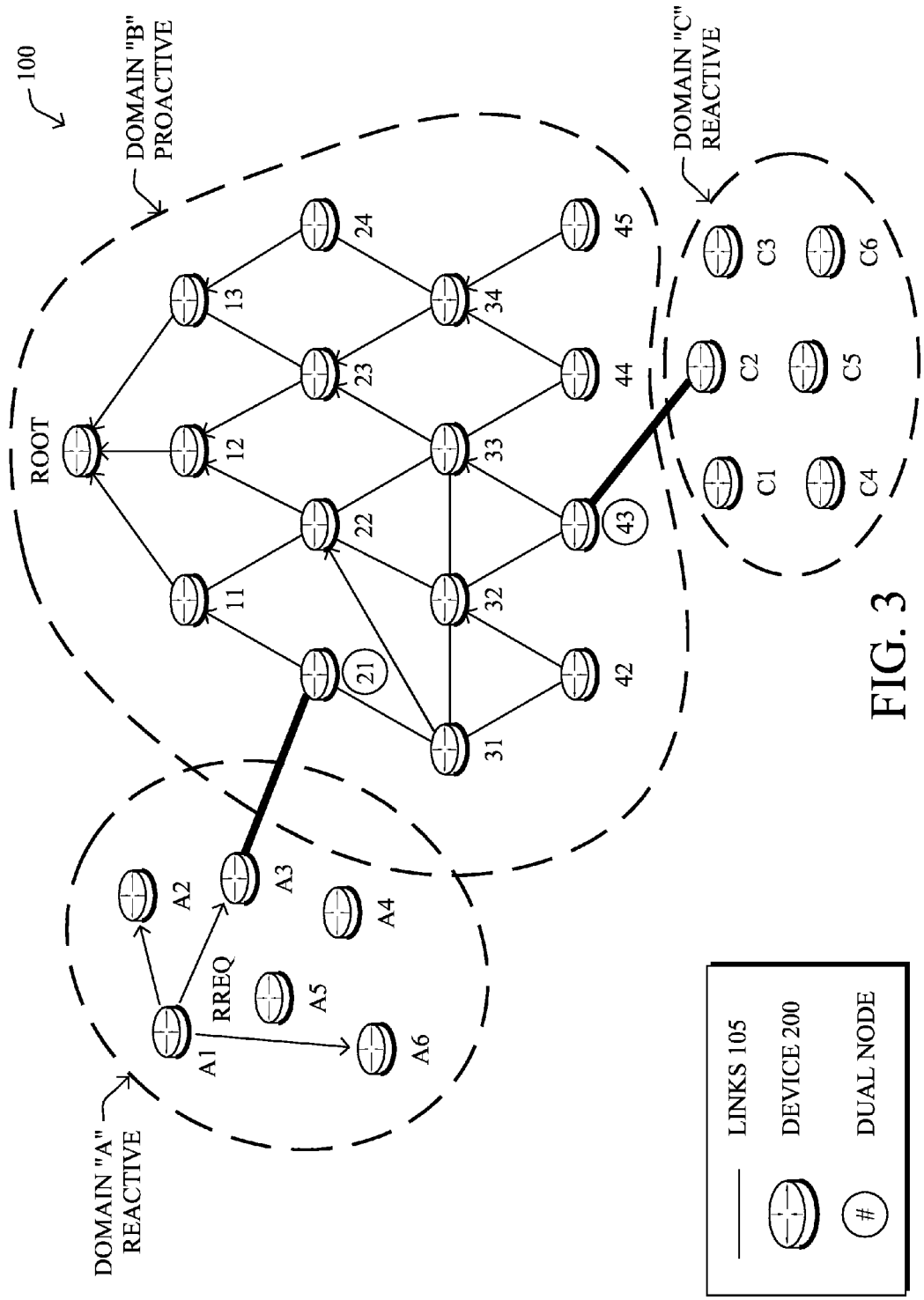
FIGS. 3-10 illustrate an example interoperation between proactive and reactive routing protocols in the network of FIG. 1.

Operationally, the techniques herein are described with reference to FIGS. 3-10, which illustrate "reactive over proactive" interoperation, that is, illustrating the interconnection of reactive routing networks/domains using a reactive protocol (such as LOAD, AODV or LOADng) via a proactive routing network/domain using a proactive routing protocol (such as RPL). As depicted in FIG. 3, two reactive domains A and C are interconnected by a proactive domain B. A shown in FIG. 3, border nodes (DUAL nodes) nodes are nodes supporting the techniques herein, usually (though not necessarily) at the fringe on both routing domains. It is worth pointing out that although there may be more than one border/DUAL node to interconnect two disparate domains (for redundancy purposes), the techniques herein do not require implementation in many nodes in the network but only at the point of interconnection. A first component of the techniques herein consists in having the DUAL nodes in the network advertise their property of acting as interconnecting nodes, e.g., using unsolicited reply packets (RREP) that may optionally contain aggregated destinations reachable through them. Note that in network 100, arrows in domain B represents the DAG computed by the proactive routing protocol such as RPL.

Reactive routing relies on the flooding of RREQ messages across a network. If node A1 tries to compute the route to C6, it floods a RREQ seeking for the destination, as shown in FIG. 3. The techniques herein propose two mode of operation:

1) Mode_1. A node in the reactive domain first initiates a route request across its domain and arms a timer T1. If after the expiration of the timer T1, no RREP packet is received, it encapsulates the RREQ message into a unicast IPv6 packet destined to a DUAL node thanks to the dynamically discovered DUAL nodes according to the dynamic advertisement specified above. Note that the timer T1 may be dynamically computed, for example, by observing the top 10% of maximum response time in domain A, or the average, multiplied by a margin factor, etc.

2) Mode_2: in this second mode of operation, the requesting node may set a newly defined flag in the RREQ message requesting all DUAL nodes receiving the requests to relay the request across the proactive domain as explained below.

Figure 4:
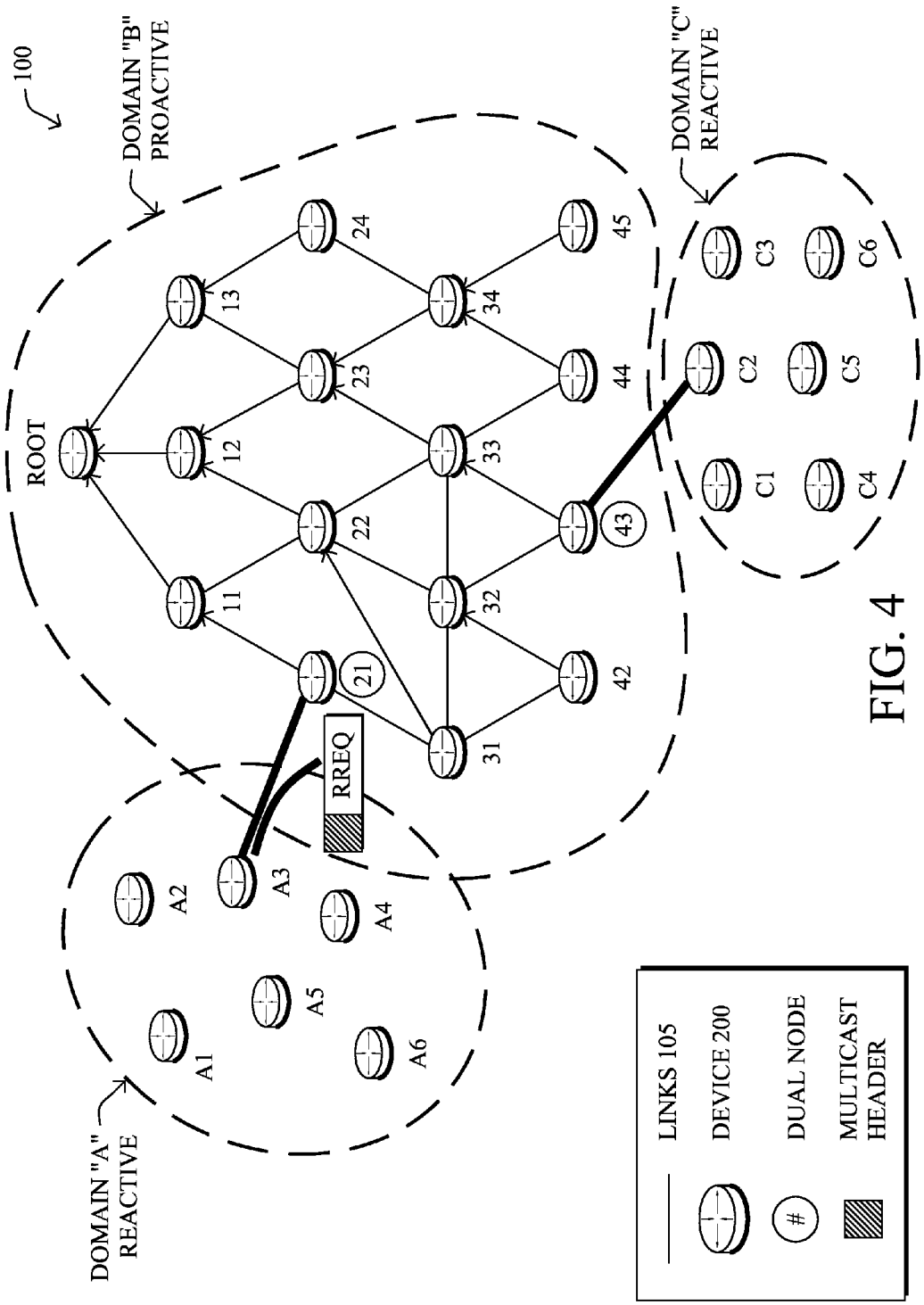

The techniques herein specify an inter-domain RREQ message, which may comprise a TLV (called "TLV S") carried in the IPv6 hop-by-hop header as shown in FIG. 4 that may comprise:

A flag called the R flag of the IPv6 hop-by-hop header set indicating that the packet is a RREQ message that must cross proactive domains (i.e., an inter-domain RREQ);
The ID of the origin reactive domain (e.g., domain A);
The searched IP destination; and
The IP address of the origin DUAL node (e.g., node 21).

At this point, the DUAL node receiving the RREQ message (encapsulated within a unicast message or a label switch path) performs the following set of actions:

1) The outer header (unicast) is removed (packet is consumed by the dual node);
2) If the destination (e.g., C6) is known by the DUAL node then the function "Reply( )" is called. Otherwise (else), the DUAL node calls the function "Search ( )".

Figure 5:
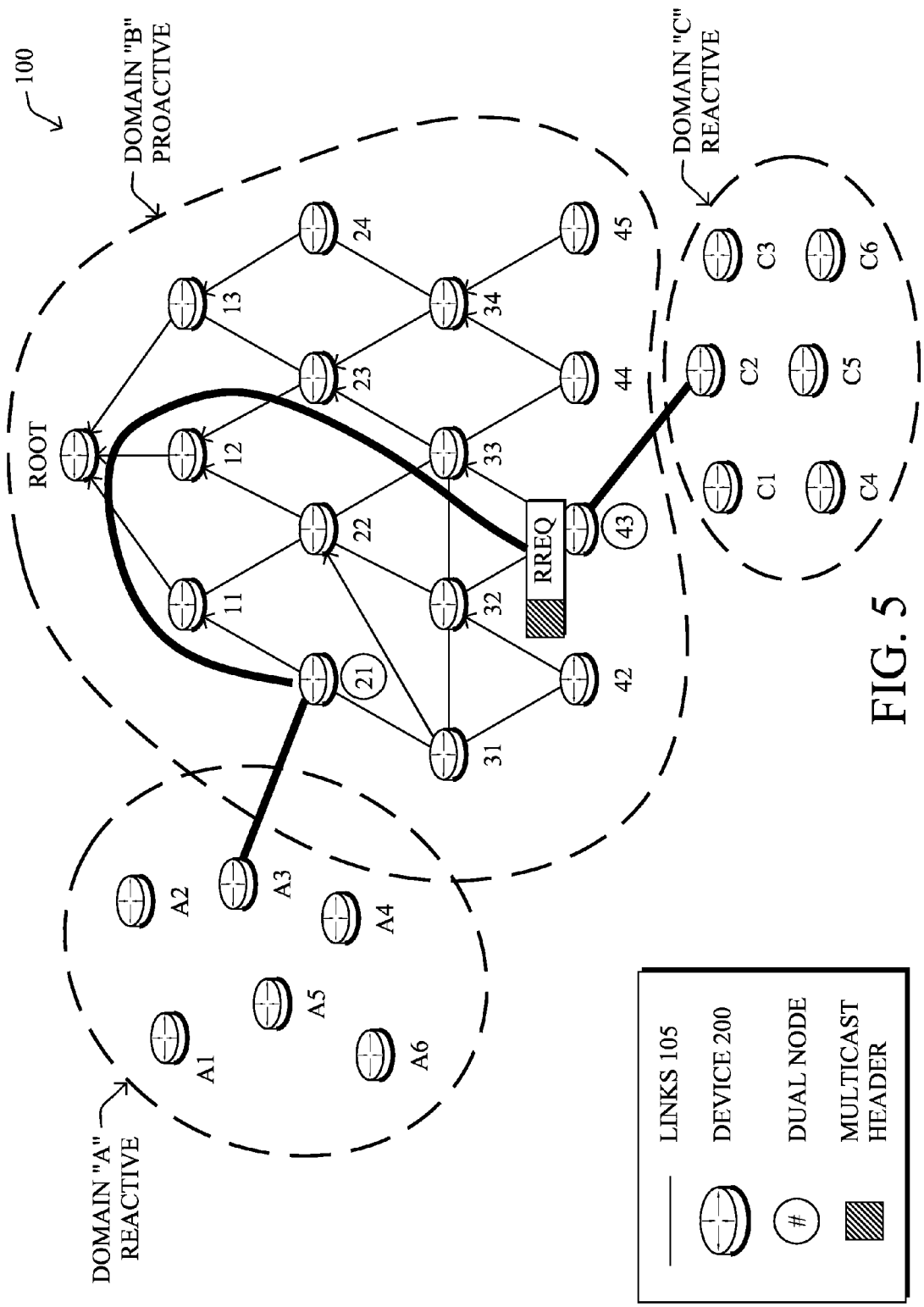
Figure 6:
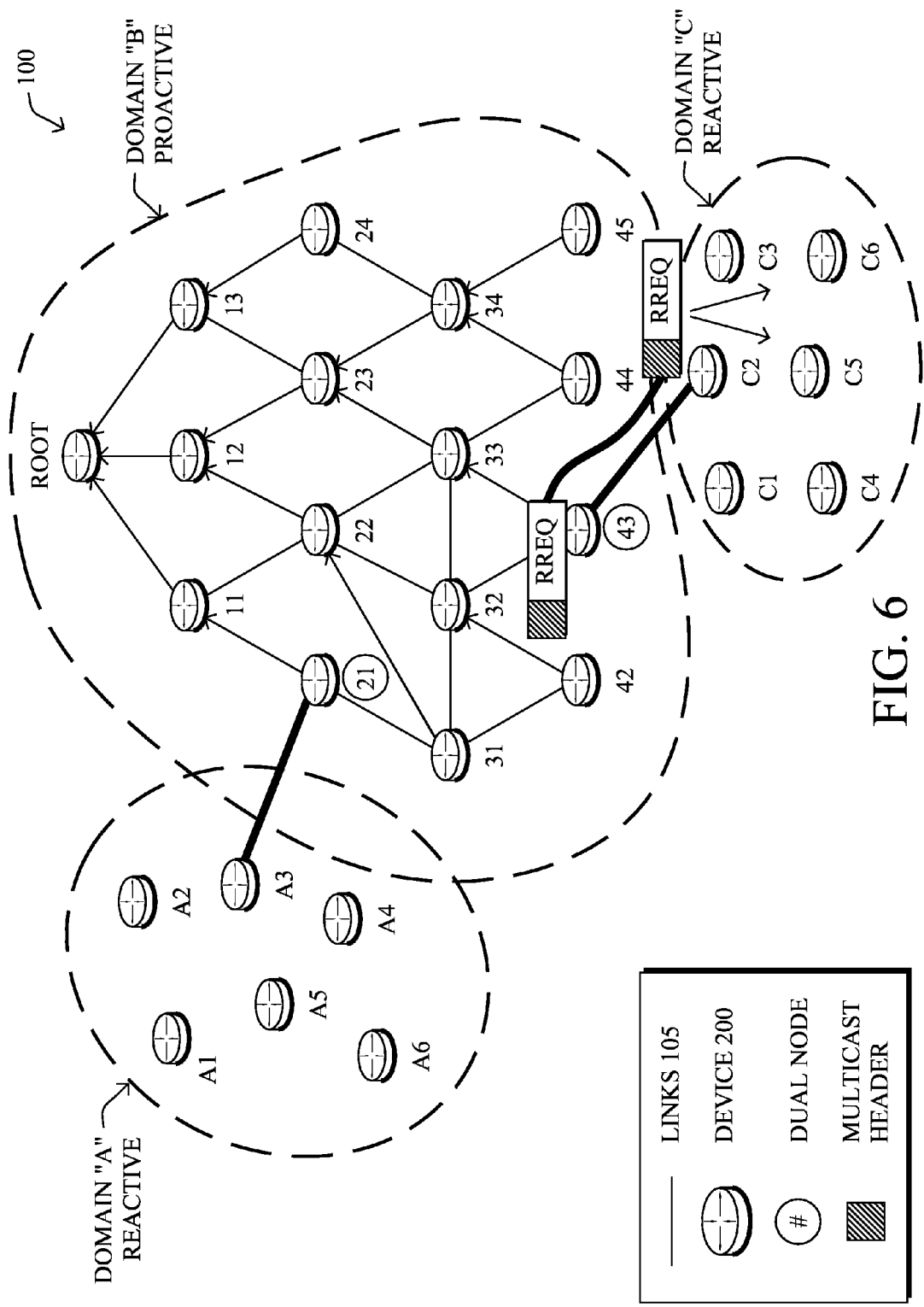
Figure 7:
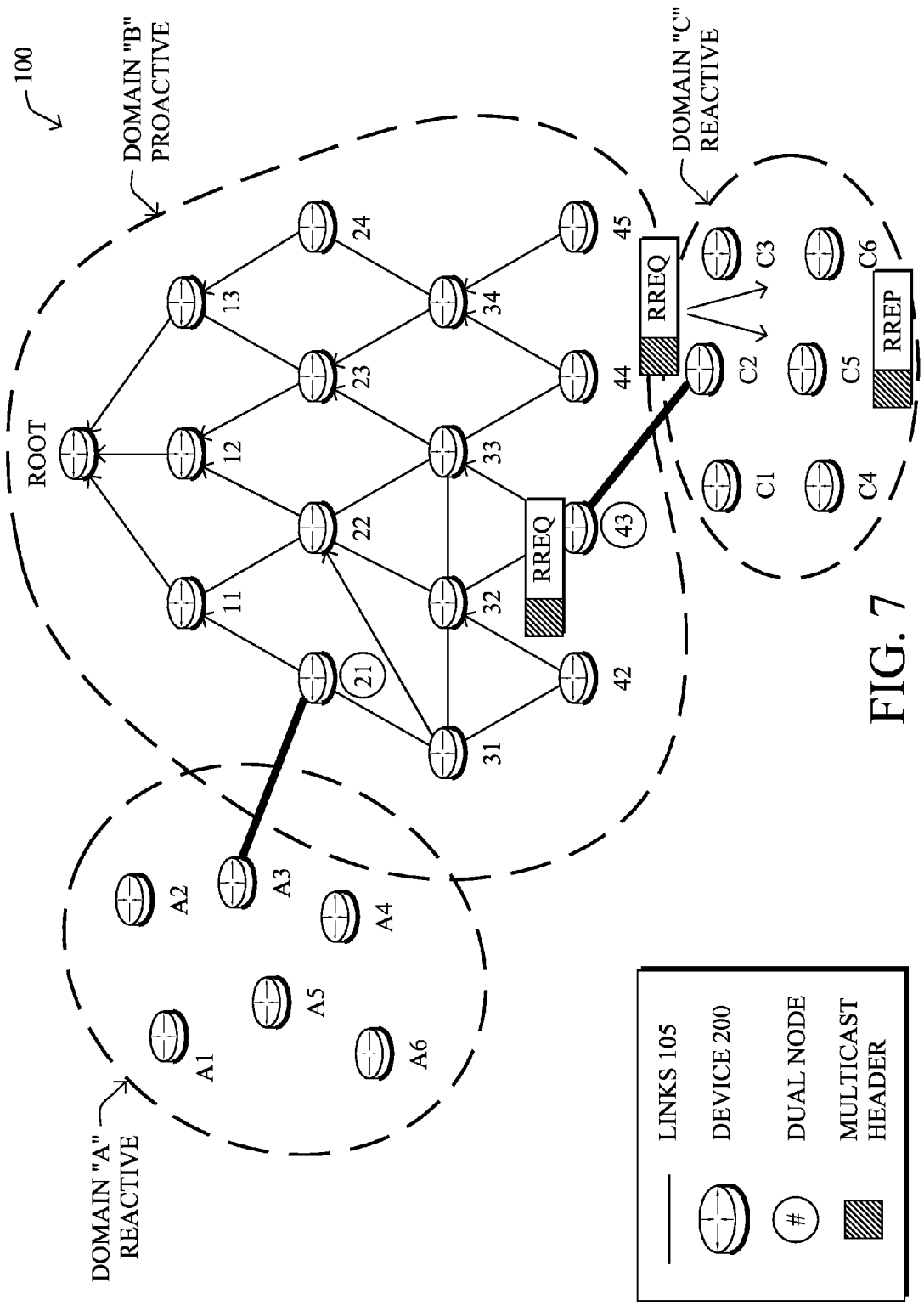
Figure 8:
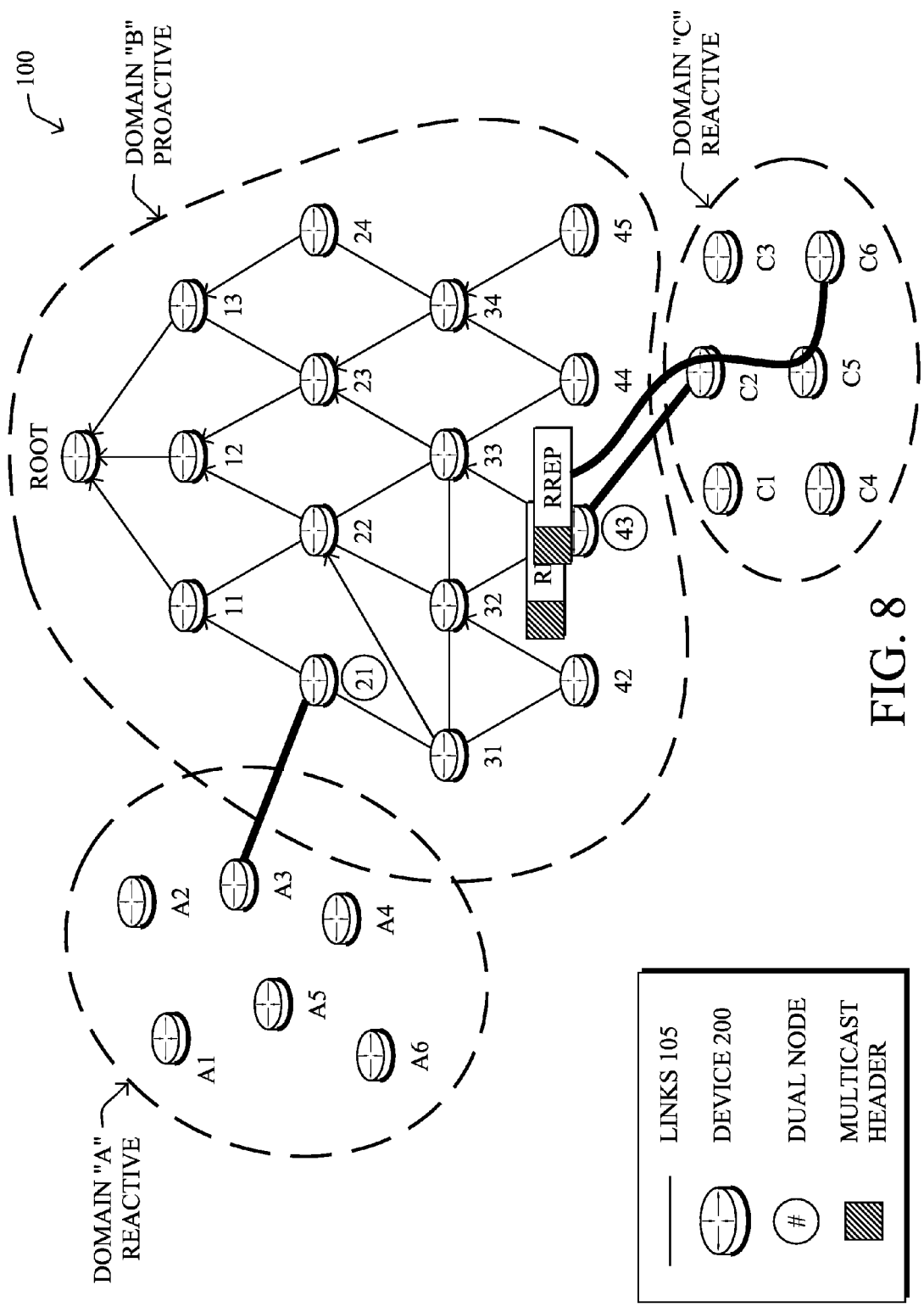

According to one or more embodiments herein, the "Search( )" function illustratively performs the following actions:

1) An outer multicast IPv6 is added that comprises the TLV S.
2) The packet is routed according to the routing table where the destination address is the address specified in the TLV S. Note that the new packet is not flooded in the network but multicasted.
3) If the proactive domain knows the address the positive reply is sent back to the requesting dual node (a node in the proactive domain in storing mode, or the DAG root in the proactive domain), otherwise the multicasted packet reaches a set of DUAL node(s), is as shown in FIG. 5. When the packet reaches a DUAL node (e.g., node 43 to node C2), the outer header is removed, and the RREQ message is restored before being flooded in the reactive domain (e.g., domain C) according to the usual procedures, as shown in FIGS. 6-8.

Figure 9:
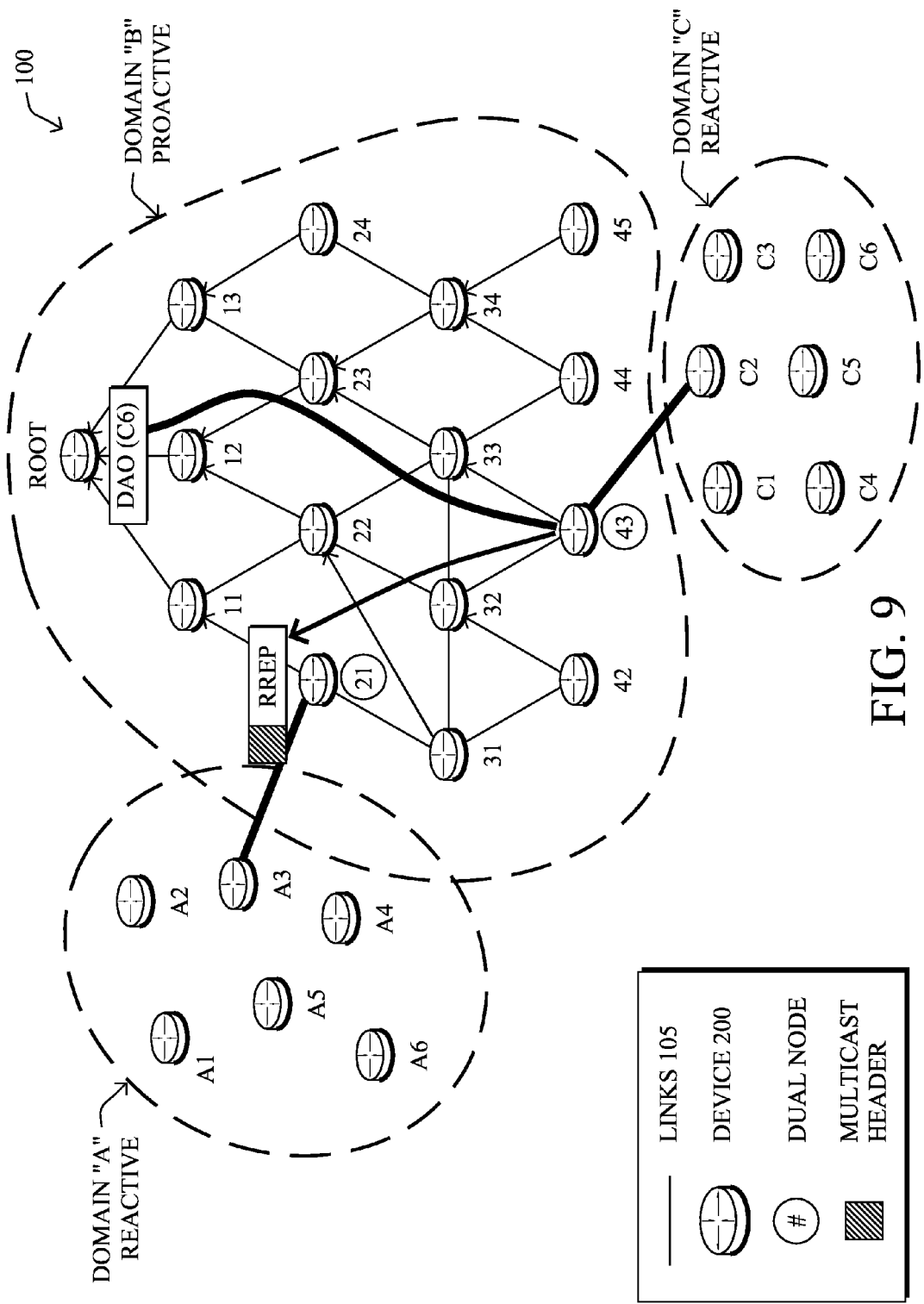

4) The receiving node arms a timer T1. If no reply is received before the expiration of the timer T1, the RREQ is silently discarded. If a reply is received before the expiration of the timer T1, as shown in FIG. 8, the DUAL node records the prefix, and generates a DAO message for the corresponding prefix, and a unicast message is sent to the requesting DUAL node (e.g., node 21) to notify that the destination has been found, each as shown in FIG. 9.

In another embodiment, a DUAL node in the entry domain (e.g.; node 21) having relayed the RREQ message may send a RREP message with a specific flag set to indicate that the search is in process (e.g., it may take some time because it traverses a proactive domain).

In yet another embodiment, the origin DUAL node may either relay the RREQ message via multicast or may relay the request by sending unicast messages to all DUAL nodes (that may be statically configured or dynamically discovered).

Note that in certain embodiments, to remove duplicated relayed RREQ messages (since if two domains are connected by more than one DUAL node, RREQ messages are likely to be received by both DUAL nodes), when a DUAL node calls the Search( ) function, it may record the request for a period of time. If a copy of the same request is received within some backoff timer, the request may be simply discarded, thus avoiding duplicated searches.

As a reminder, proactive routing support two modes of operation: storing mode (routers store routing tables) or non-storing mode (routers do not store routing tables except the root) in which case packets are routed up to the DAG root and then source routed to their destination. The algorithm above is generally the same for both proactive modes of operation, differing only in where the inter-domain RREQ is transmitted within the proactive routing network.

Figure 10:
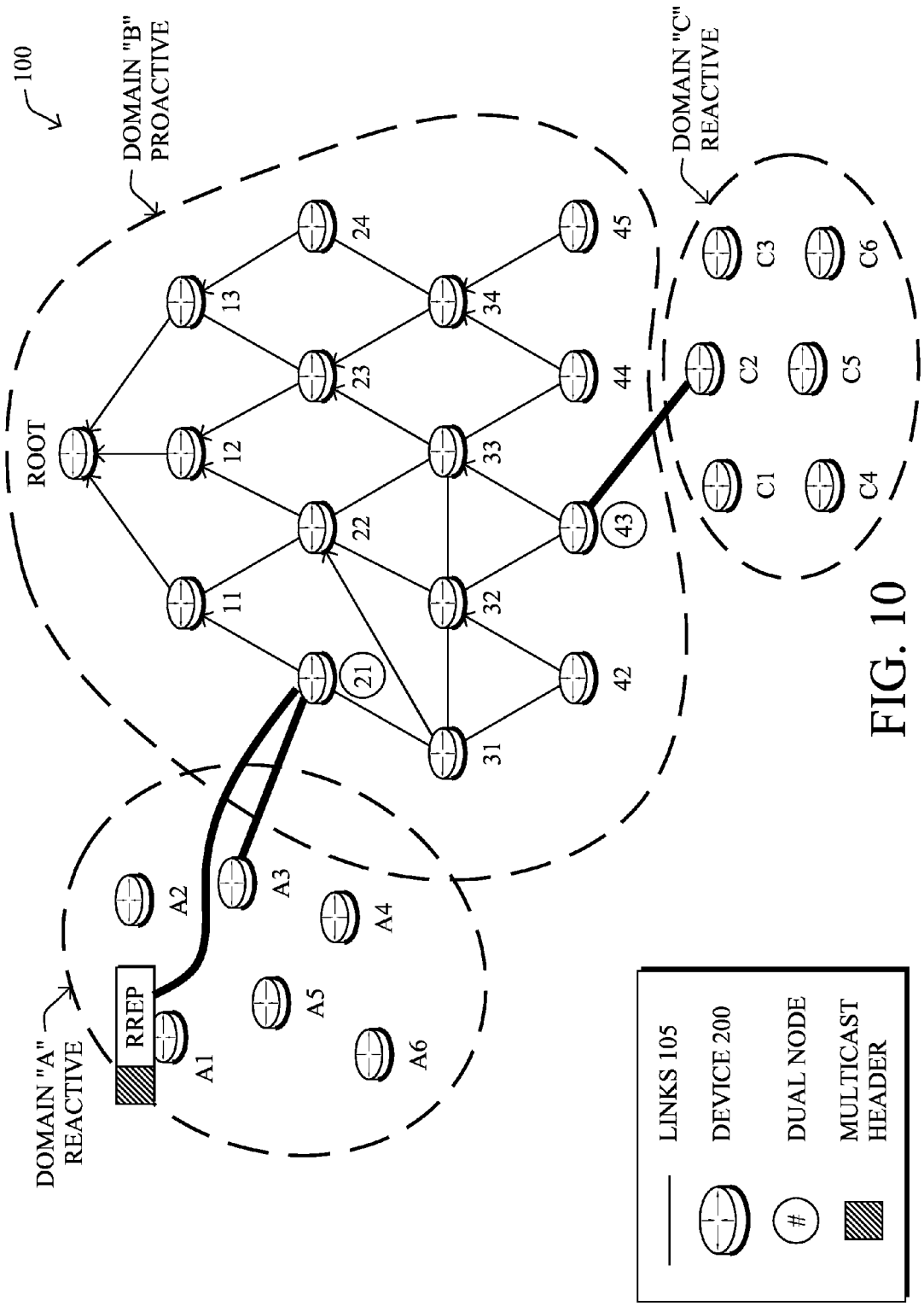

For the "Reply( )" function, the DUAL node has received a RREQ message for which it knows the searched prefix. The DUAL node may thus generate a RREP message as shown in FIG. 10, optionally setting an indication that the DUAL is acting as a proxy. The positive reply may be obtained according to a unicast message received from the remote DUAL node that has found the search prefix.

Upon receiving the reply (RREP message) from the DUAL node acting as a proxy, the requesting node (e.g., A1) may forward packets using loose hop routing where the path is explicit to the DUAL node acting as a proxy, and the next loose hop is the destination itself. Upon receiving the user packet, a DUAL node on the other side of the proactive network (e.g., node 43) routes the packet into the reactive routing domain (e.g., via node C2).

Note that should another packet be sent for a prefix learned according to the techniques above, the set of mechanisms mentioned above may no longer be needed since DAO maintenance will take care of maintenance the freshness of the advertised prefix.

In yet another embodiment, should a negative DAO be received for a prefix whose route was discovered according to the techniques above, the DUAL node may send an unsolicited negative RREP into the origin reactive domain to invalidate the route.

Figure 11:
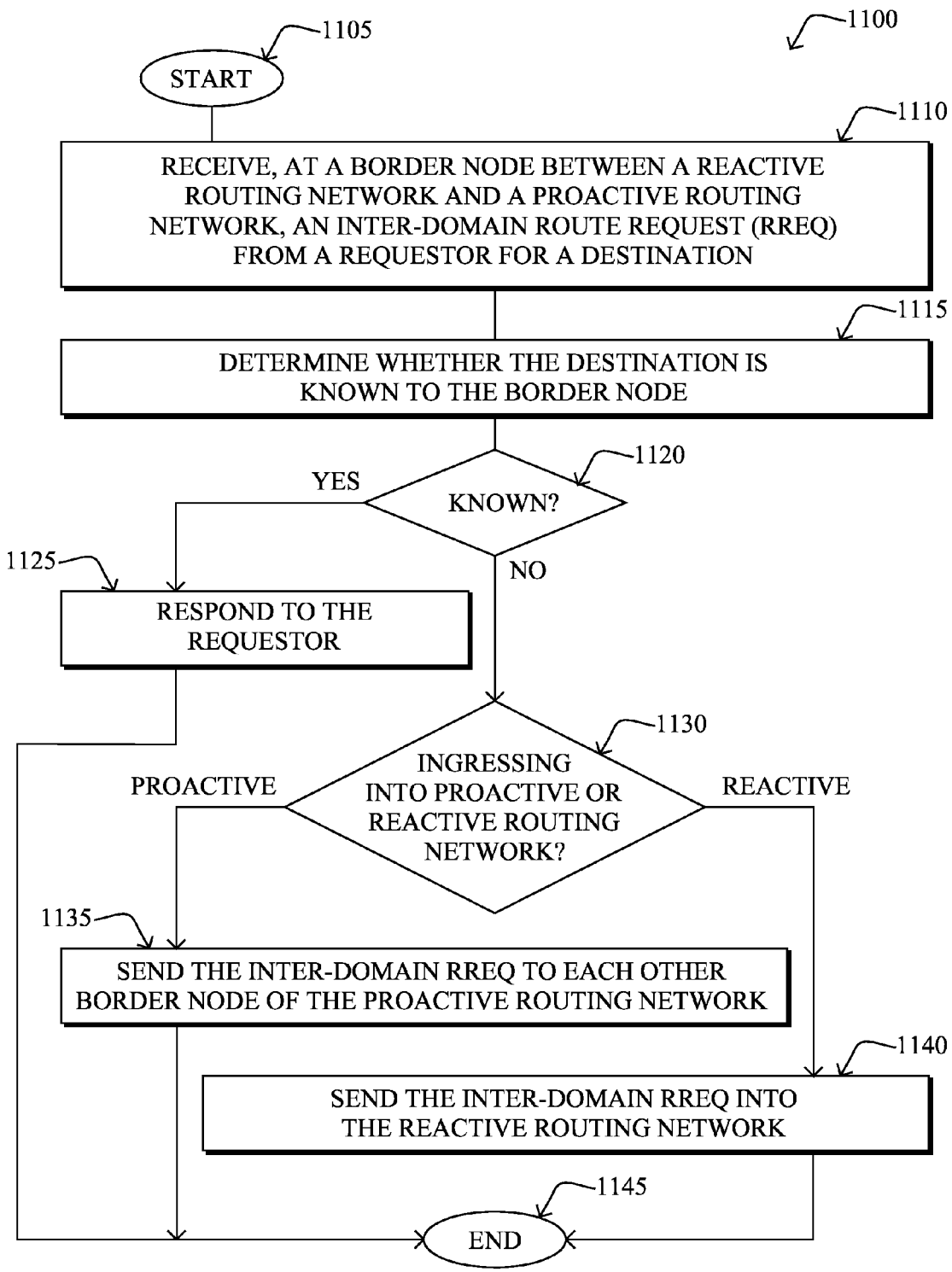
FIG. 11 illustrates an example simplified procedure for interoperation between proactive and reactive routing protocols in a communication network, particularly from the perspective of a border node (DUAL node)

FIG. 11 illustrates an example simplified procedure 1100 for interoperation between proactive and reactive routing protocols in a communication network in accordance with one or more embodiments described herein, particularly from the perspective of a border node (DUAL node) between a reactive routing network and a proactive routing network. The procedure 1100 may start at step 1105 (e.g., after advertising capability of the border node to act as a border node), and continues to step 1110, where, as described in greater detail above, the border node receives an inter-domain RREQ from a requestor for a destination. As noted above, the inter-domain RREQ may be unicast to the border node from the requestor (e.g., within the originating reactive routing network). Also as noted above, the inter-domain RREQ may be explicitly indicated as being an inter-domain RREQ. In step 1115, the border node determines whether it knows the destination, and if so in step 1120, then in step 1125 the border node may respond to the requestor. For example, as described above, responding to the requestor may comprise returning a RREP to an originating border node ingressing the inter-domain RREQ from an originating reactive routing network into the proactive routing network, where the originating border node then returns the RREP to the requestor in the originating reactive routing network (i.e., where the border node is between the proactive routing network and a remote reactive routing network), or else may comprise returning a RREP to the requestor (i.e., where the border node is between the reactive routing network of the requestor and the proactive routing network).

If in step 1120 the border (DUAL) node does not know the destination, then in step 1130 it is determined whether the border node is ingressing into the proactive or reactive routing network. If proactive, then in step 1135 the border node may send (e.g., multicast) the inter-domain RREQ to each other border node of the proactive routing network, as detailed above. Alternatively, when ingressing into the reactive routing network, the border node may send the inter-domain RREQ into the reactive routing network in step 1140. The procedure 1100 may illustratively end in step 1145, notably with the option of loose-hop routing subsequently sent messages to the destination between border nodes of the proactive routing network, as mentioned above.

Figure 12A:
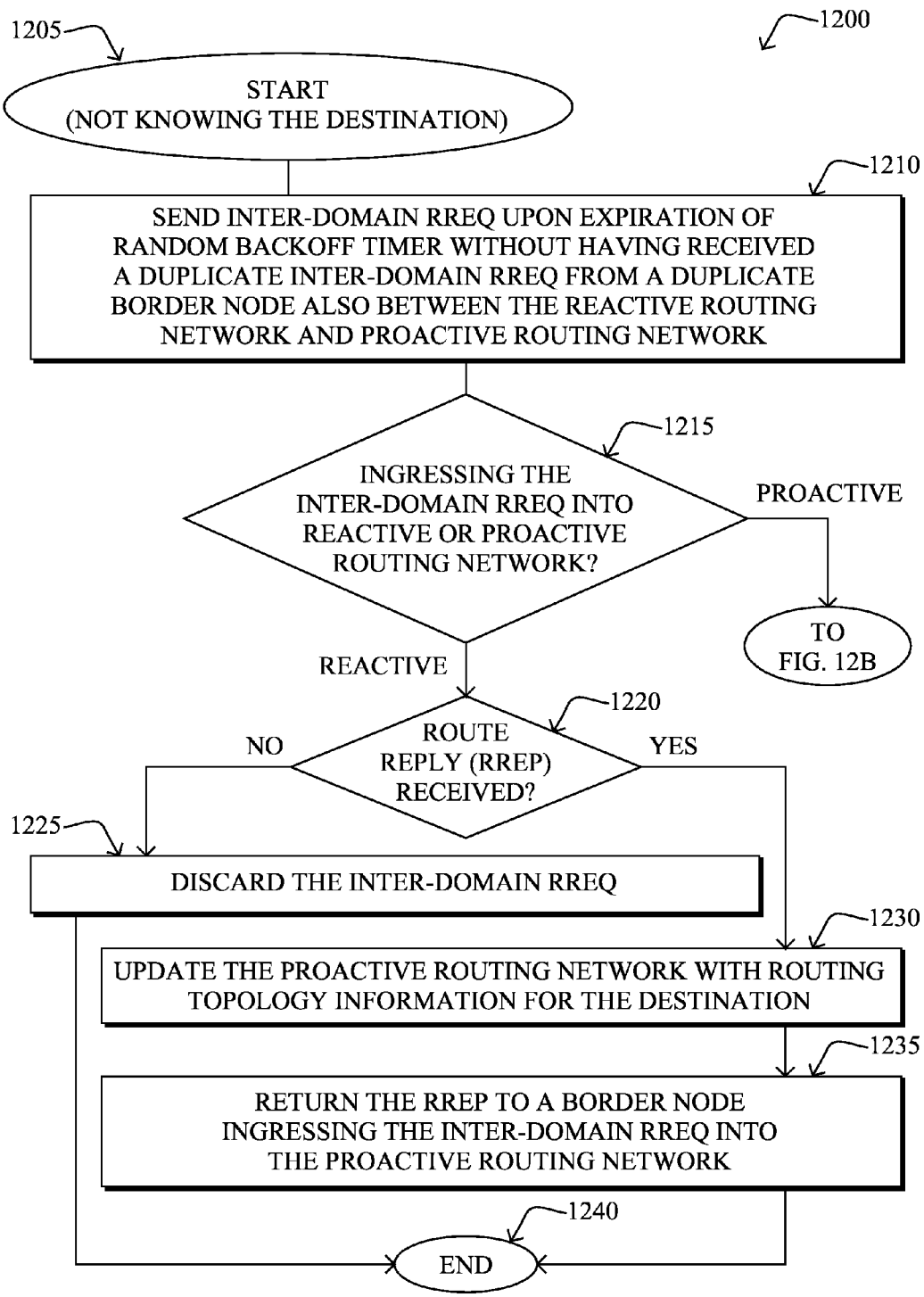
FIGS. 12A-12B illustrate another example simplified procedure for interoperation between proactive and reactive routing protocols in a communication network from the perspective of a border node (DUAL node) not knowing the destination.
Figure 12B:
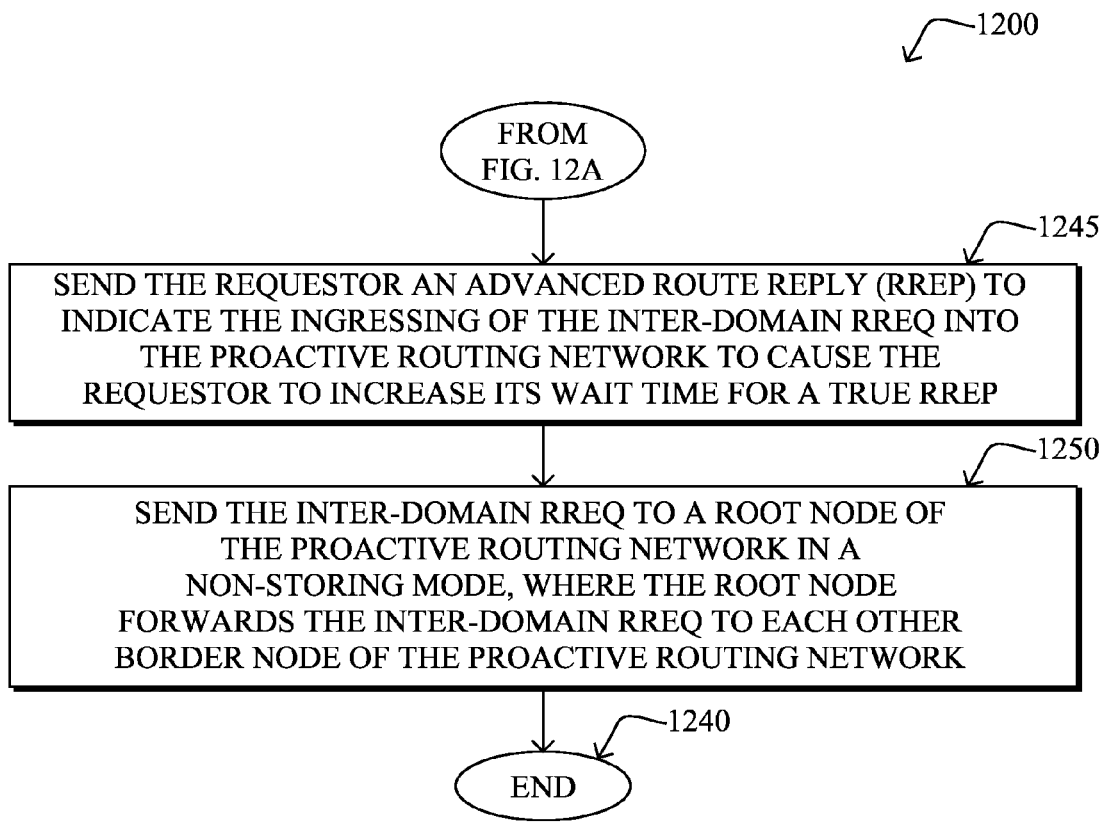

In addition, FIGS. 12A-12B illustrate another example simplified procedure 1200 for interoperation between proactive and reactive routing protocols in a communication network from the perspective of a border node (DUAL node) not knowing the destination. The procedure 1200 may start at step 1205 (not knowing the destination), and continues to step 1210, where, as described in greater detail above, the border node may send the inter-domain RREQ upon expiration of random backoff timer without having received a duplicate inter-domain RREQ from a duplicate border node also between the reactive routing network and proactive routing network. Depending upon whether the border node is ingressing the inter-domain RREQ into reactive or proactive routing network in step 1215, the procedure may continue to FIG. 12B (proactive), or else to step 1220 (reactive), where the border node determines whether an RREP has been received. If not, then in step 1225 the border node may simply discard the inter-domain RREQ. However, if a RREP is received in step 1220, then in step 1230 the border node may update the proactive routing network with routing topology information for the destination, and returns the RREP to a border node ingressing the inter-domain RREQ into the proactive routing network in step 1235, thus ending the procedure 1200 in step 1240.

With reference to FIG. 12B, when ingressing into the proactive routing network, the border node may send the requestor an advanced RREP in step 1245 to indicate the ingressing of the inter-domain RREQ into the proactive routing network to cause the requestor to increase its wait time for a true RREP. Also, in step 1250, the border node may optionally send the inter-domain RREQ to a root node of the proactive routing network in a non-storing mode, where the root node forwards the inter-domain RREQ to each other border node of the proactive routing network, as discussed above. The procedure may also then end at step 1240 in FIG. 12B.

Figure 13:
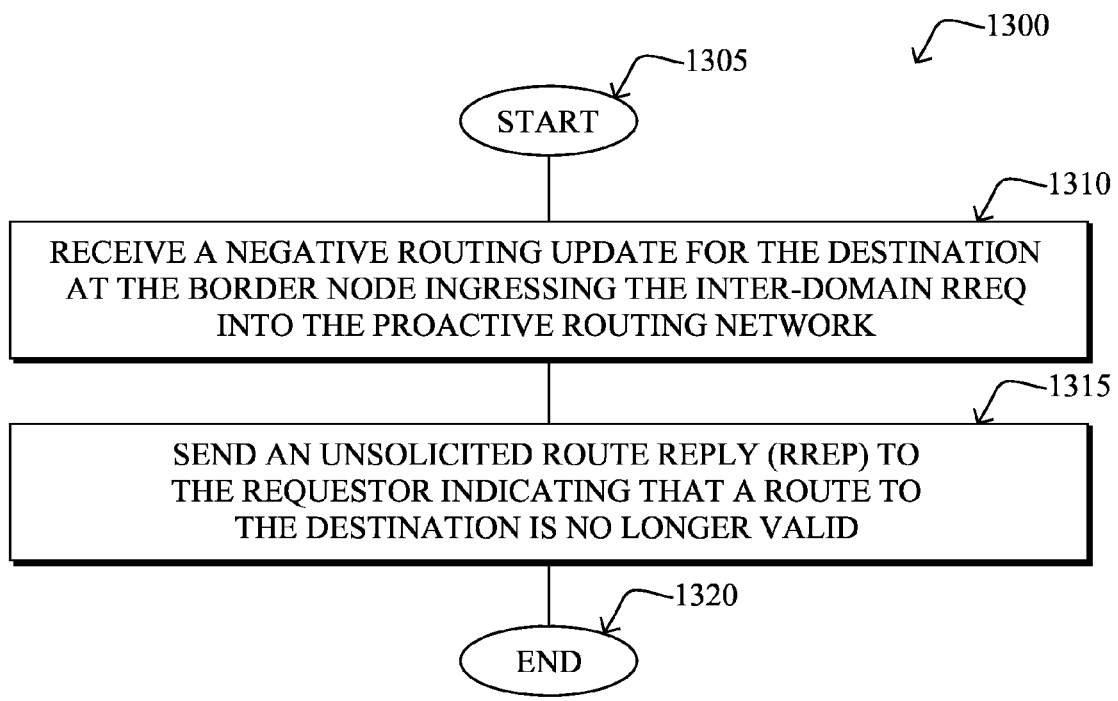
FIG. 13 illustrates another example simplified procedure for interoperation between proactive and reactive routing protocols from the perspective of a border node (DUAL node)

Moreover, FIG. 13 illustrates another example simplified procedure 1300 for interoperation between proactive and reactive routing protocols from the perspective of a border node (DUAL node). The procedure 1300 may start at step 1305, and continues to step 1310, where, as described in greater detail above, the border node (ingressing the inter-domain RREQ into the proactive routing network) may receive a negative routing update for the destination, and as such, may send an unsolicited RREP to the requestor indicating that a route to the destination is no longer valid in step 1315. The procedure 1300 may then end in step 1320.

Figure 14:
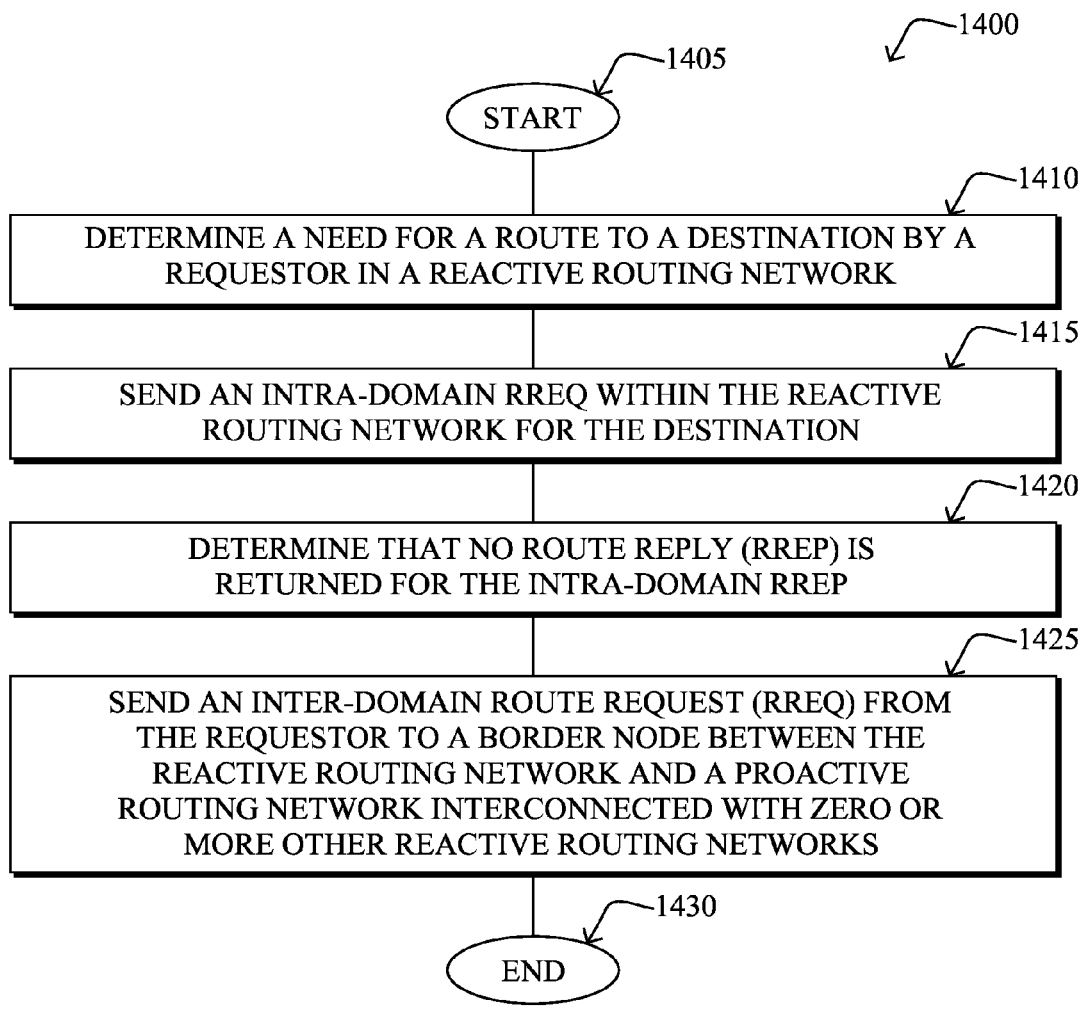
FIG. 14 illustrates an example simplified procedure for interoperation between proactive and reactive routing protocols in a communication network, particularly from is the perspective of a requesting node in a reactive routing network.

FIG. 14 illustrates an example simplified procedure 1400 for interoperation between proactive and reactive routing protocols in a communication network in accordance with one or more embodiments described herein, particularly from the perspective of a requesting node in a reactive routing network. The procedure 1400 may start at step 1405, and continues to step 1410, where, as described in greater detail above, the requestor in a reactive routing network determines a need for a route to a destination, and sends an intra-domain RREQ within the reactive routing network for the destination in step 1415, accordingly. If in step 1420 the requesting node determines that no RREP is returned for the intra-domain RREP (from within the reactive routing network), then in step 1425 the requestor sends an inter-domain RREQ to a border node between the reactive routing network and a proactive routing network interconnected with zero or more other reactive routing networks, and the procedure 1400 illustratively ends in step 1430 (notably while waiting for an associated RREP, as described herein).

Figure 15:
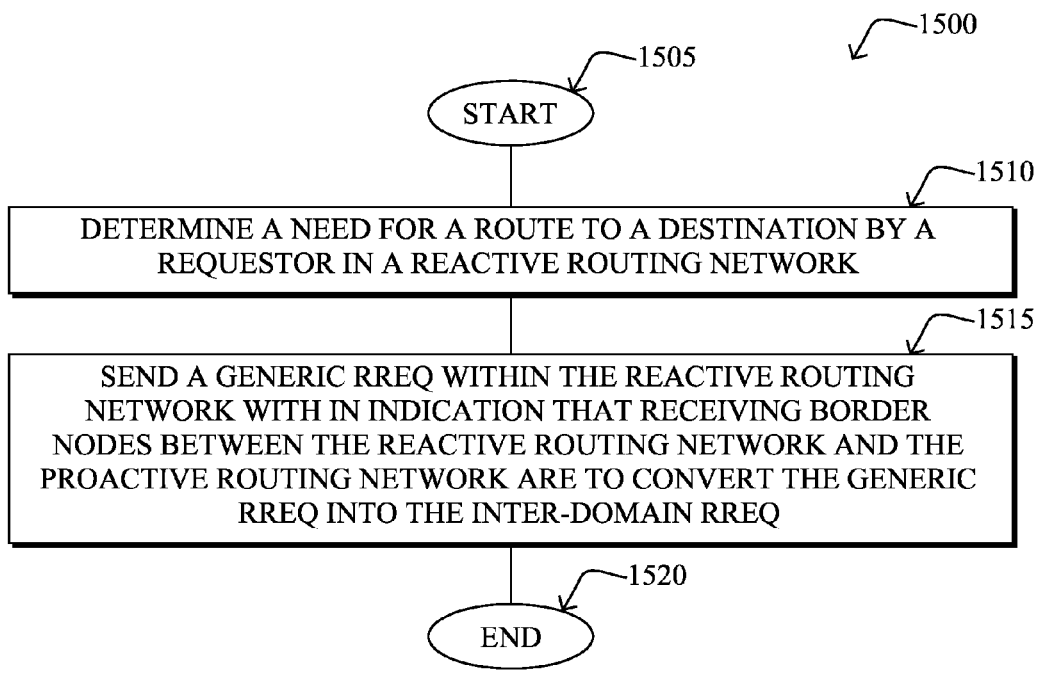
FIG. 15 illustrates another example simplified procedure for interoperation between proactive and reactive routing protocols in a communication network, particularly from the perspective of a requesting node in a reactive routing network.

Alternatively, FIG. 15 illustrates another example simplified procedure 1500 for interoperation between proactive and reactive routing protocols in a communication network in accordance with one or more embodiments described herein, particularly from the perspective of a requesting node in a reactive routing network. The procedure 1500 may start at step 1505, and continues to step 1510, where, as described in greater detail above, the requestor again determines a need for a route to a destination. Here, however, in step 1515 the requestor sends a generic RREQ within the reactive routing network with in indication that receiving border nodes between the reactive routing network and the proactive routing network are to convert the generic RREQ into the inter-domain RREQ. The procedure 1500 illustratively ends in step 1520.

It should be noted that while certain steps within procedures 1100-1500 may be optional as described above, the steps shown in FIGS. 11-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1500 are described separately, certain steps from each procedure may be incorporated into each other procedure, and the procedures are not meant to be mutually exclusive.

The techniques described herein, therefore, provide for interoperation between proactive and reactive routing in a communication network. In particular, the techniques herein allow for inter-operating two or more domains using different routing paradigms (reactive and proactive), which is an important feature for utilities, enterprises and Service Providers having two modes of operation in their network. As of today, there is no way to interconnect these domains. The techniques herein may be used for network migration, e.g., to move reactive networks to proactive mode of operation.

While there have been shown and described illustrative embodiments of techniques for interoperation between proactive and reactive routing in communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, such as RPL and LOAD, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a first border node between a reactive routing network and a proactive routing network that includes a plurality of border nodes, unsolicited route reply (RREP) packets from each other border node of the proactive routing network, wherein an unsolicited RREP from a particular other border node includes an address of the other border node and an indication that the other border node borders the proactive routing network and another reactive routing network;
    receiving, at the first border node, an inter-domain route request (RREQ) from a requestor for a destination;
    determining whether the destination is known to the first border node;
    in response to knowing the destination at the first border node, responding to the requestor; and
    in response to not knowing the destination at the first border node:
        when the first border node is ingressing the inter-domain RREQ into the proactive routing network, encapsulating the inter-domain RREQ in a multicast message and sending the encapsulated multicast message to each of the other border nodes of the proactive routing network, wherein routes to the other border nodes are known to the first border node based on the unsolicited RREP packets from the other border nodes; and
        when the first border node is ingressing the inter-domain RREQ into the reactive routing network, stripping the inter-domain RREQ from a multicast message sent from one of the other border nodes and sending the stripped inter-domain RREQ into the reactive routing network as a flooded request.

2. The method as in claim 1, wherein in response to knowing the destination at the first border node, responding to the requestor comprises:
    returning a route reply (RREP) to the requestor, wherein the first border node is between the reactive routing network of the requestor and the proactive routing network.

3. The method as in claim 1, further comprising:
    advertising a capability of the first border node to act as a border node to the other border nodes in the proactive routing network as an unsolicited RREP message.

4. The method as in claim 1, wherein in response to not knowing the destination at the first border node, and when the first border node is ingressing the inter-domain RREQ into the reactive routing network, the method further comprises:
    determining that no route reply (RREP) is received from the reactive routing network; and, in response,
    discarding the inter-domain RREQ.

5. The method as in claim 1, wherein in response to not knowing the destination at the first border node, and when the first border node is ingressing the inter-domain RREQ into the reactive routing network, the method further comprises:
    determining that a route reply (RREP) is received from the reactive routing network for the destination in response to ingressing the inter-domain RREQ into the reactive routing network; and
    in response to determining that the RREP is received:
        updating the proactive routing network with routing topology information for the destination; and
        returning the RREP to a border node ingressing the inter-domain RREQ into the proactive routing network.

6. The method as in claim 1, wherein in response to not knowing the destination at the first border node, and when the first border node is ingressing the inter-domain RREQ into the proactive routing network, the method further comprises:
    sending the requestor an advanced route reply (RREP) to indicate the ingressing of the inter-domain RREQ into the proactive routing network to cause the requestor to increase its wait time for a true RREP.

7. The method as in claim 1, wherein in response to not knowing the destination at the first border node, and when the first border node is ingressing the inter-domain RREQ into the proactive routing network, the method further comprises:
    sending the inter-domain RREQ to each other border node of the proactive routing network upon expiration of random backoff timer without having received a duplicate inter-domain RREQ from another border node also between the reactive routing network and proactive routing network.

8. The method as in claim 1, wherein in response to not knowing the destination at the first border node, and when the first border node is ingressing the inter-domain RREQ into the proactive routing network, sending the inter-domain RREQ to each other border node of the proactive routing network comprises:
    sending the inter-domain RREQ to a root node of the proactive routing network in a non-storing mode, wherein the root node forwards the inter-domain RREQ to each other border node of the proactive routing network.

9. The method as in claim 1, further comprising:
    using loose-hop routing between the border nodes of the proactive routing network to route subsequently sent messages to the destination.

10. The method as in claim 1, further comprising:
receiving a negative routing update for the destination at the first border node ingressing the inter-domain RREQ into the proactive routing network; and, in response,
sending an unsolicited route reply (RREP) to the requestor indicating that a route to the destination is no longer valid.

11. The method as in claim 1, wherein the inter-domain RREQ is explicitly indicated as being an inter-domain RREQ.

12. An apparatus, comprising:
one or more network interfaces to communicate as a border node between a reactive routing network and a proactive routing network;
a processor coupled to the network interfaces and configured to execute one or more processes; and
a memory configured to store a process executable by the processor, the process when executed operable to:
  receive unsolicited route reply (RREP) packets from each other border node of the proactive routing network, wherein an unsolicited RREP from a particular other border node includes an address of the other border node and an indication that the other border node borders the proactive routing network and another reactive routing network;
  receive an inter-domain route request (RREQ) from a requestor for a destination;
  determine whether the destination is known to the border node;
  in response to knowing the destination at the border node, respond to the requestor; and
  in response to not knowing the destination at the border node:
    when the border node is ingressing the inter-domain RREQ into the proactive routing network, encapsulate the inter-domain RREQ in a multicast message and send the encapsulated multicast message to each of the other border nodes of the proactive routing network, wherein routes to the other border nodes are known to the first border node based on the unsolicited RREP packets from the other border nodes; and
    when the border node is ingressing the inter-domain RREQ into the reactive routing network, strip the inter-domain RREQ from a multicast message sent from one of the other border nodes and send the stripped inter-domain RREQ into the reactive routing network as a flooded request.

13. The apparatus as in claim 12, wherein the process when executed to respond to the requestor in response to knowing the destination at the border node is further operable to:
return a route reply (RREP) to the requestor when the border node is between the reactive routing network of the requestor and the proactive routing network.

14. The apparatus as in claim 12, wherein the process, when executed in response to not knowing the destination at the border node, and when the border node is ingressing the inter-domain RREQ into the reactive routing network, is further operable to:
determine that a route reply (RREP) is received from the reactive routing network for the destination in response to ingressing the inter-domain RREQ into the reactive routing network; and
in response to determining that the RREP is received:
  update the proactive routing network with routing topology information for the destination; and
  return the RREP to a border node ingressing the inter-domain RREQ into the proactive routing network.

15. The apparatus as in claim 12, wherein the process, when executed to send the inter-domain RREQ to each other border node of the proactive routing network in response to not knowing the destination at the border node when the border node is ingressing the inter-domain RREQ into the proactive routing network, is further operable to:
send the inter-domain RREQ to a root node of the proactive routing network in a non-storing mode, wherein the root node forwards the inter-domain RREQ to each other border node of the proactive routing network.

16. The apparatus as in claim 12, wherein the process when executed is further operable to:
loose-hop route subsequently sent messages to the destination between border nodes of the proactive routing network.

17. A tangible, non-transitory, computer-readable media having software encoded thereon, the software when executed by a processor operable to:
receive, at a border node that borders a reactive routing network and a proactive routing network, unsolicited route reply (RREP) packets from each other border node of the proactive routing network, wherein an unsolicited RREP from a particular other border node includes an address of the other border node and an indication that the other border node borders the proactive routing network and another reactive routing network;
receive an inter-domain route request (RREQ) from a requestor for a destination;
determine whether the destination is known to the border node;
in response to knowing the destination at the border node, respond to the requestor; and
in response to not knowing the destination at the border node:
  when the border node is ingressing the inter-domain RREQ into the proactive routing network, encapsulate the inter-domain RREQ in a multicast message and send the encapsulated multicast message to each of the other border nodes of the proactive routing network, wherein routes to the other border nodes are known to the first border node based on the unsolicited RREP packets from the other border nodes; and
  when the border node is ingressing the inter-domain RREQ into the reactive routing network, strip the inter-domain RREQ from a multicast message sent from one of the other border nodes and send the stripped inter-domain RREQ into the reactive routing network as a flooded request.

* * * * *

UNITED STATES PATENT AND TRADEMARK OFFICE
CERTIFICATE OF CORRECTION

PATENT NO.        : 8,934,496 B2                           Page 1 of 1
APPLICATION NO.   : 13/561716
DATED             : January 13, 2015
INVENTOR(S)       : Jean-Philippe Vasseur It is certified that error appears in the above-identified patent and that said Letters Patent is hereby corrected as shown below:

In the Specification

In column 1, line 61, please amend as follows:
    cols in a communication network, particularly from the

In column 5, line 44, please amend as follows:
    distance vector routing protocol that builds a Directed

In column 8, line 1, please amend as follows:
    a set of DUAL node(s), as shown In FIG. 5. When the packet

Signed and Sealed this
Eighth Day of September, 2015

Michelle K. Lee
*Director of the United States Patent and Trademark Office*